(12) United States Patent
Corell et al.

(10) Patent No.: US 7,805,671 B1
(45) Date of Patent: *Sep. 28, 2010

(54) STYLE SHEET GENERATION

(75) Inventors: Rob K. Corell, Round Rock, TX (US); Shawn A. Gaither, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 703 days.

This patent is subject to a terminal disclaimer.

(21) Appl. No.: 11/779,153

(22) Filed: Jul. 17, 2007

Related U.S. Application Data

(63) Continuation of application No. 09/436,044, filed on Nov. 8, 1999, now Pat. No. 7,249,318.

(51) Int. Cl.
*G06F 17/00* (2006.01)

(52) U.S. Cl. .................. 715/236; 715/235; 715/243

(58) Field of Classification Search ............ 715/235, 715/236, 243
See application file for complete search history.

(56) References Cited

U.S. PATENT DOCUMENTS

| | | | |
|---|---|---|---|
| 5,621,875 A | | 4/1997 | Mason et al. |
| 5,740,425 A | | 4/1998 | Povilus |
| 5,860,073 A | * | 1/1999 | Ferrel et al. .................. 715/255 |
| 5,983,248 A | * | 11/1999 | DeRose et al. .............. 715/234 |
| 6,023,714 A | * | 2/2000 | Hill et al. .................... 715/235 |
| 6,088,711 A | * | 7/2000 | Fein et al. .................... 715/269 |
| 6,336,124 B1 | * | 1/2002 | Alam et al. .................. 715/205 |
| 6,463,440 B1 | * | 10/2002 | Hind et al. .................. 715/235 |
| 6,589,291 B1 | * | 7/2003 | Boag et al. .................. 715/235 |
| 6,668,354 B1 | * | 12/2003 | Chen et al. .................. 715/255 |
| 6,931,532 B1 | * | 8/2005 | Davis et al. ................. 713/167 |
| 6,978,367 B1 | * | 12/2005 | Hind et al. .................. 713/167 |
| 2005/0074018 A1 | * | 4/2005 | Zintel et al. ................. 370/401 |

OTHER PUBLICATIONS

BCL Computers, "Gohtm.com", service information, 2 pgs., 1999, www.gohtm.com.
BCL Computers, "Magellan 4.1 User Manual", 19 pgs, downloaded on Mar. 17, 2000, www.bcl-computers.com.

* cited by examiner

*Primary Examiner*—Rachna S Desai
(74) *Attorney, Agent, or Firm*—Fish & Richardson P.C.

(57) ABSTRACT

Methods and apparatus, including computer program apparatus, implementing techniques for processing a formatted computer-readable source document to create a style sheet. The techniques include partitioning the formatted text into multiple groups of words; deriving an element style a predefined element that is assigned to two or more groups of words; and creating an electronic document including a style sheet defining the element style.

25 Claims, 2 Drawing Sheets

STYLE SHEET GENERATION

CROSS-REFERENCE TO RELATED APPLICATIONS

This application is a continuation application of and claims priority to U.S. application Ser. No. 09/436,044, now U.S. Pat. No. 7,249,318 filed on Nov. 8, 1999.

BACKGROUND OF THE INVENTION

The present invention relates to generating style sheets for use with markup language documents.

Style sheets are used to give a common look to a collection of documents. A style sheet contains codes (generally but not necessarily found in one document) that specify formatting for the parts of a document—such as body text, headings, list items, quotes, and so on. Generally, style sheets and documents are in electronic form. With style sheets, the content of a document can be separated from its presentation.

Cascading Style Sheets (CSS) is a style sheet mechanism that extends the HyperText Markup Language (HTML). CSS enables the precise placement of HTML document elements and the precise selection of fonts in HTML documents. CSS can be used by a Web (World Wide Web) page designer to give a common look and feel to large number of documents.

The Cascading Style Sheets, level 1 (CSS1) standard is a W3C (World Wide Web Consortium) Recommendation. It describes the CSS language as well as a simple visual formatting model. The CSS, level 2 (CSS2) standard builds on CSS1 and adds support for media-specific style sheets (e.g., printers and aural devices), downloadable fonts, element positioning and tables. CSS1 is a simple style sheet mechanism that allows authors and readers to attach style (e.g., fonts, colors and spacing) to HTML documents. The CSS1 language is human readable and writable, and expresses style in common desktop publishing terminology. One of the fundamental features of CSS is that style sheets cascade; authors can attach a preferred style sheet, while the reader may have a personal style sheet to adjust for human or technological handicaps. CSS2 is a style sheet language that allows authors and users to attach style (e.g., fonts, spacing, and aural cues) to structured documents (e.g., HTML documents and XML applications).

Other style sheet languages exist as well. For example, the Extensible Stylesheet Language (XSL) Specification, a work in progress of the W3C, defines a language for expressing stylesheets. An XSL stylesheet specifies the presentation of a class of XML documents by describing how an instance of the class is transformed into an Extensible Markup Language (XML) document that uses the formatting vocabulary.

Systems exist that can generate a style sheet from a source document. Generally, such systems are limited to particular file formats, i.e., electronic representations of the source document, or generate style sheets that are specific to the source document and therefore not easily usable by a human user for preparing new documents.

SUMMARY OF THE INVENTION

The invention can be used to generate style sheets automatically from any kind of source document. The style sheets can easily be used by a human user, or by an automatic system, for preparing new documents having the same look as the source document. In particular, the invention can be used to generate CSS style sheets automatically from a document generated by an optical character recognition (OCR) description of a scanned document.

In general, in one aspect, the invention provides methods and apparatus, including computer program apparatus, implementing techniques for processing a formatted computer-readable source document to create a style sheet. The techniques can include partitioning the formatted text into one or more groups of words; deriving an element style for each of the predefined elements that is assigned to at least one group or words; and creating an electronic document including a style sheet defining each of the element styles.

The source document can have one or more pages of text including a plurality of words. Each word can have one or more characters. Each character has a character appearance that can be defined by one or more font properties. Each word has a word appearance that can be defined by the font properties of its characters and a position of the word on a page. The formatted text can be partitioned into one or more groups of words. Each group of words has a group appearance that can be defined by one or more text properties. Each group of words is assigned at least one element from a predefined set of markup language elements. The element style can include a character style, a layout style or both. The character style is derived from the font properties of the characters of the words in the groups of words to which the element is assigned. The layout style is derived from the text properties of the groups of words to which the element is assigned.

Advantageous implementations of the invention include one or more of the following features. The invention allows a system to partition the text into groups of words according to word positions, font properties of the words in the text, or both. The invention allows the system to assign an element to each group of words solely on the basis of the position of the group of words on the page, solely on the basis of the font properties of the words in the group of words, or based on the position of the group of words on the page and the font properties of the words in the group of words.

For each element assigned to at least one group of words, the invention allows the system to compare the group appearances of all groups of words to which the element is assigned, and create one or more alternate elements if the differences among the group appearances exceed a predefined threshold. The original element or an alternate element can be assigned to each group of words. A numeric value defining the predefined threshold can be a preprogrammed numeric value, or a numeric value obtained from user input.

The set of predefined elements can be the set of HyperText Markup Language elements defined in HTML 4.0, or the set of Extensible Markup Language elements defined in XML 1.0. The predefined set of elements can include a header element, a paragraph element, an address element, a blockquote element, a list element, a table element and a caption element. The character style can include at least one font property and an associated value. The font property can be selected from a predefined set of font properties including a font family, a font style, a font weight, a font variant and a font size. The layout style can include at least one text property and an associated value. The text property can be selected from a predefined set of text properties including a text decoration, a text alignment, a text indentation and a text transformation as defined in CSS1.

The source document can be derived from a raster image of the text processed by an optical character recognition (OCR) process. The raster image of the text can be translated into a HTML description of the text. Page margins can be detected and set for the document page. The style sheet can be an extensible style sheet (XSL). The invention allows the system to create an electronic document having a markup language version of the source document.

Advantages that can be seen in implementations of the invention include one or more of the following. The invention processes a source document to create a human readable and writable style sheet that may be used with any markup language document, not just a markup language document related to the source document. When used with multiple markup language documents, the generated style sheet defines a common appearance for the multiple markup language documents. The generated style sheet derives an element style for each of a small number of elements assigned to the source document. The majority of the elements on the style sheet are selected from a predefined set of markup language elements, with a custom element style being created only after a corresponding predefined element style has been assigned. A user can use the generated style sheet for one source document as an authoring tool to create markup language versions of one or more other source documents.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
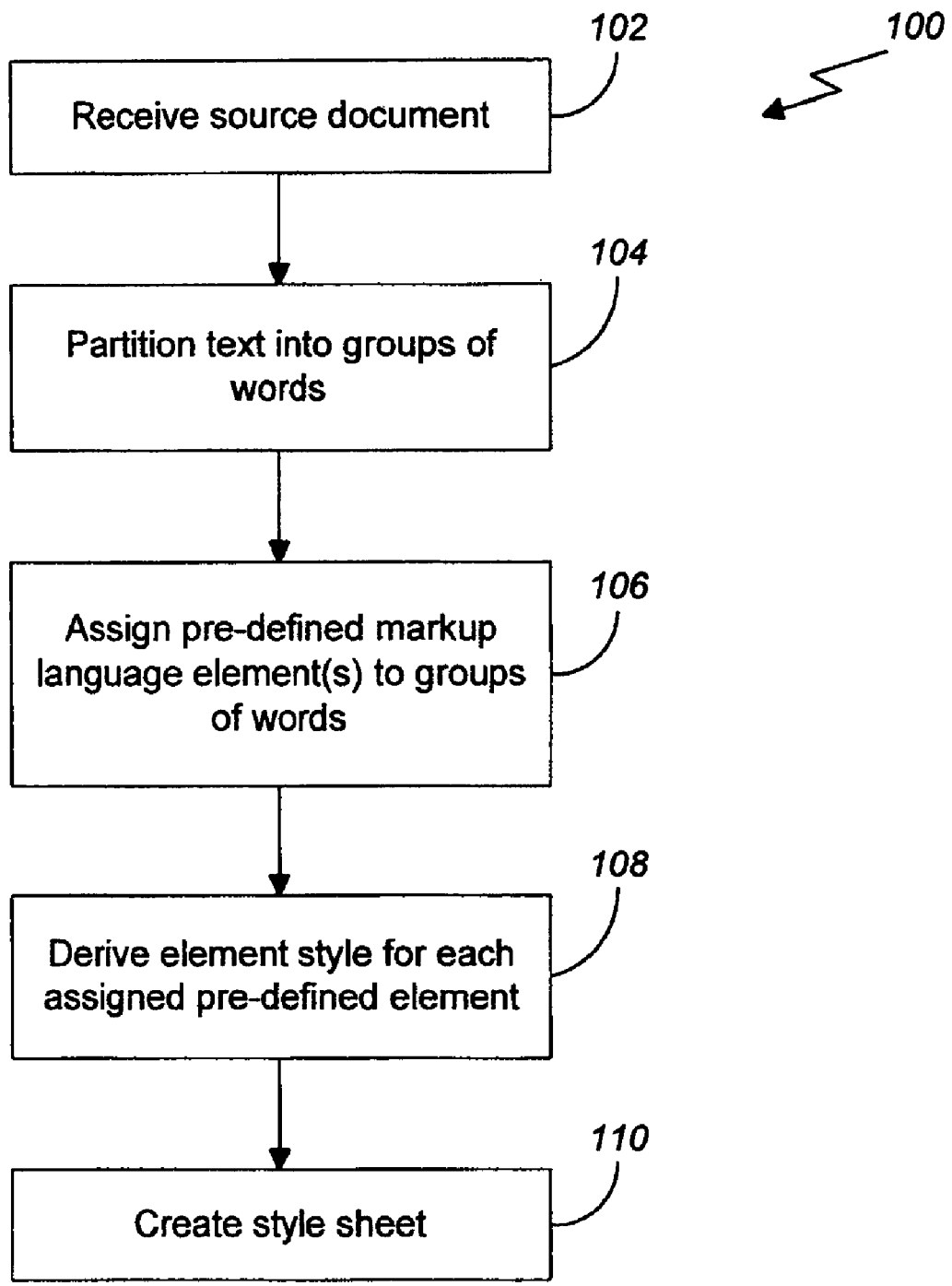
FIG. 1 is a flowchart of a process for processing a formatted computer-readable source document to create a style sheet.

FIG. 1 shows a process 100 suitable for implementation in a computer program application for processing a formatted computer-readable source document to create a style sheet. The style sheet can be a stand-alone document, or it can be one of multiple components in an electronic document.

The source document received by the application (step 102) has one or more pages of text. Each word on a page of a formatted document is characterized by a position of the word on the page and a word appearance defined by the font properties of its characters.

The application partitions the formatted text into groups of words (step 104). The application can be configured to partition the text into groups of words according to: (i) the positions of the words; (ii) the font properties of the words; or (iii) both.

Each group of words in the partitioned text is assigned at least one element from a predefined set of markup language elements (step 106). The application can be configured to assign each group of words at least one element based on: (i) the position of the group of words on the page; (ii) the font properties of the words in the group of words; or (iii) both. The predefined set of markup language elements can include an address element, a blockquote element, a header element, a paragraph element, a list element, a table element and a caption element. In one implementation, the markup language elements are HyperText Markup Language (HTML) elements as defined in HTML 4.0. In an alternative implementation, the markup language elements are Extensible Markup Language (XML) elements as defined in XML 1.0.

Figure 2:
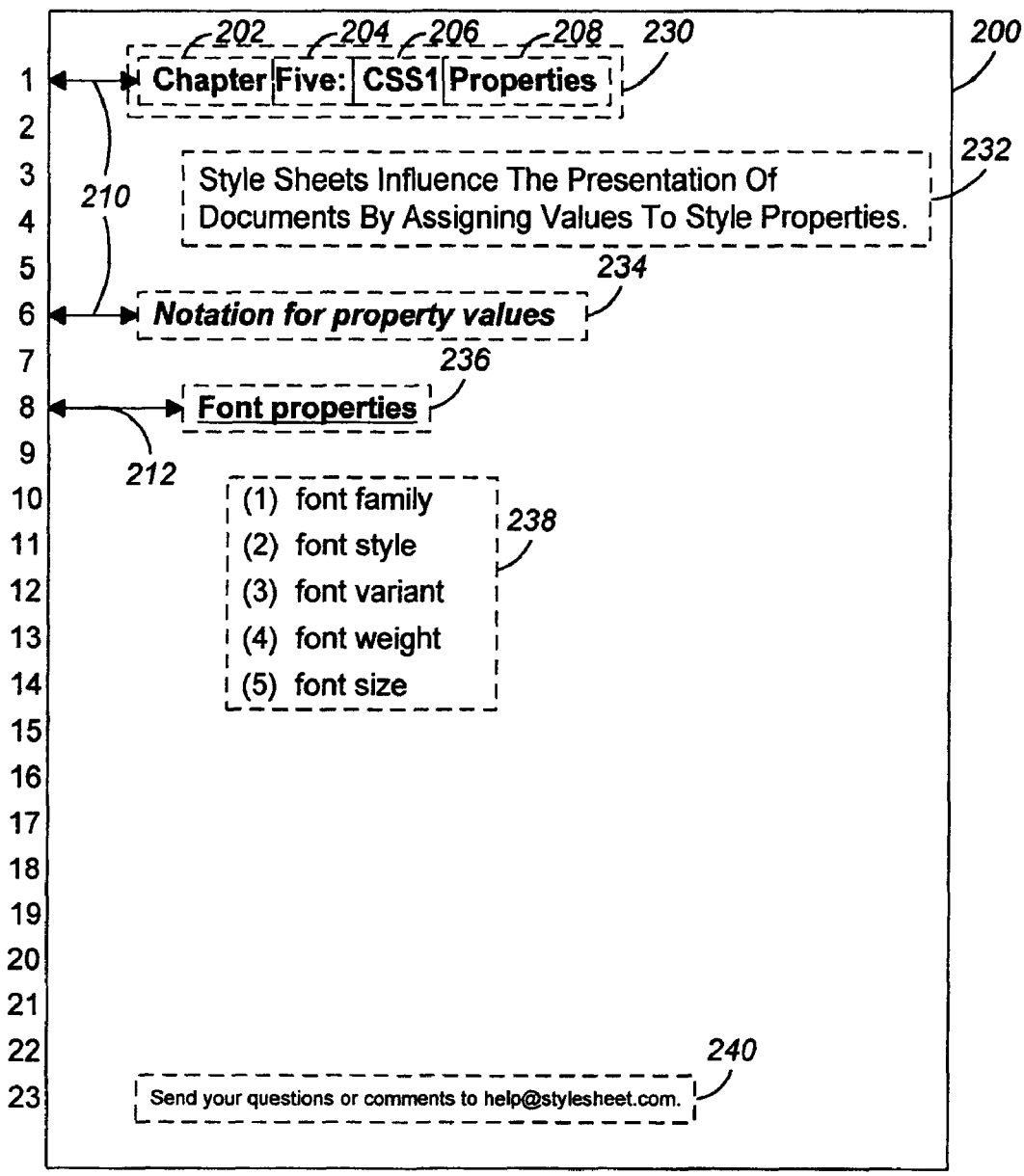
FIG. 2 shows a page of the source document partitioned into groups of words.

FIG. 2 shows a page of text 200. Line numbers have been added to the side of FIG. 2 for illustrative purposes. With the application configured to partition the text according to the words' positions, adjacent words (e.g., words 202, 204, 206 and 208 on line 1) are grouped together to form a word group 230. Adjacent lines of words (e.g., lines 3-4) having similar positions relative to the page are also grouped together to form a word group 232. Once the text has been completely partitioned into groups of words (step 104), an element is assigned to each group of words (step 106). For example, the application may assign word group 230 and word group 234 a header element H1 and word group 236 a header element H2, where H1 and H2 are HTML 4.0 elements, based on the similar distance 210 of word group 230 and word group 234 from an edge of the page compared to the distance 212 of word group 236 from the same edge. In this example, the difference in the font properties of the words in word group 230 and word group 234 is ignored when assigning the header element H1 solely on the basis of the position of each group of words on the page.

Alternatively, if the text is partitioned according to the font properties of the words in the text, the application assigns, for example, a header element H1 to word group 230 and word group 236, and a header element H2 to word group 234, based on the similar set of font properties shared by the words in word group 230 and word group 236 compared to the different set of font properties of the words in word group 234. The difference in the relative position of word group 230 and word group 236 is ignored when assigning the header element H1 solely on the basis of font properties.

As a final example, if the text is partitioned according to both the positions and the font properties of the words in the text, word group 230 may be assigned, for example, a header element H1, while word group 232 is assigned a paragraph element P, word group 234 is assigned a header element H2, word group 236 is assigned a header element H3, word group 238 is assigned a list element LI and word group 240 is assigned an address element ADDRESS, all of which elements are of HTML 4.0. In this example, the groups of words are assigned different elements because none of the groups share both similar relative positions on the page and similar font properties in the text.

Returning to FIG. 1, the application derives an element style for each of the assigned predefined elements (step 108). The element style includes a character style, a layout style or a combination of both. Each character style includes at least one font property and its associated value, and is derived from the font properties of the words in the group of words to which the element is assigned. An example of a character style is a typeface of the words in the group of words. In one implementation, the font property is selected from a predefined set of font properties including a font family, a font style, a font weight, a font variant and a font size. Similarly, each layout style includes at least one text property and its associated value, and is derived from the text properties of the group of words to which the element is assigned. In one implementation, the text property is selected from a predefined set of text properties defined in CSS1, including a text decoration, a text alignment, a text indentation and a text transformation. For example, returning to FIG. 2, the group appearance of word group 232 shows that the first character of each word in word group 232 is uppercased. In this implementation, the application may define the layout style of word group 232 in part by a text property of "text transform: capitalize". The application may also define the layout style of word group 236 in part by a text property of "text decoration: underline" since the group appearance of word group 236 shows that the words are underlined.

To derive an element style for an element assigned to more than one group of words, the application compares the character style and the layout style of the groups of words to which the element is assigned. If the difference in the character style and the layout style of the groups of words exceeds a threshold, one or more alternate elements may be created. The threshold is a numeric value x specified by a user of the application, or it can be a preprogrammed numeric value x stored in the application. The application may be configured to create an alternate element if at least (100–x) % of the words in the groups of words to which the element is assigned have a different set of font properties or text properties or both. For example, a comparison of the character style and the layout style of word groups 230 and 234 shows that both word groups 230 and 234 share the same layout style and a similar character style. The difference between the character style of the two groups is in the value of the "font style" property, with word group 234 being defined in part by a font property of "font style: italic", whereas word group 230 is defined in part by a font property of "font style: regular". The application may be configured to ignore the difference and assign a header element H1 to both word groups 230 and 234, where the element style of the header element H1 is derived in part from the most common character style of the words in the two groups. Alternatively, the application may be configured to create an alternate header element alt_H1, and assign either element H1 or element alt_H1 to word groups 230 and 234. In this configuration, the style of element H1 is derived in part from the most common character style of the words in the two groups and the style of element alt_H1 is derived in part from, for example, the next most common character style of the words in the two groups. An alternate of an element may only be created after the element has been assigned to at least one group of words.

Once an element style is derived for each of the assigned elements, the application creates a style sheet (step 110). The style sheet defines the derived element style for each of the elements assigned to the groups of words of the source document. In addition, the style sheet may include detected page margin information for a page of the source document. In one implementation, the style sheet is a cascading style sheet (CSS). In another implementation, the style sheet is an extensible style sheet (XSL). The style sheet may be used with any source document represented in a suitable markup language document, such as HTML or XML to give the source document a particular appearance when formatted for display or printing. The style sheet may also be used with multiple markup language documents to give the documents a common appearance when formatted, by a Web browser, for example. Optionally, in addition to generating a style sheet, the application may be configured to create a markup language version of the source document by marking up the text of the source document with the elements in the generated style sheet.

A user can use a style sheet generated by the application as an authoring tool for "marking-up" documents to create markup language versions of multiple source documents sharing a similar appearance with the source document when formatted for display or printing. The user provides the other source documents with an appearance similar to that of the mark-language version of an original source document by assigning elements having element styles defined in the style sheet generated from the original source document.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. The invention has been described in terms of a document or an electronic document. It should be understood that these do not necessarily correspond to a file in a computer or network file system. A document may be stored in a portion of a file that holds other documents, in a single file dedicated to the document in question, or in a set of coordinated files.

The invention can be used to generate a CSS1 style sheet from a source document generated by an optical character recognition (OCR) description of a scanned document. The application can be configured to process the source document to create an HTML document by translating the optical character recognition (OCR) description of the scanned document into an HTML description of the scanned document. The generated CSS 1 style sheet may be used with the HTML document to give the source document a particular appearance when formatted by a CSS1-extended HTML Web browser.

What is claimed is:

1. A method for deriving a style sheet from a document generated by an optical character recognition (OCR) description of a scanned document, the method comprising:

receiving an OCR document, the OCR document being an electronic document generated by an OCR description of a scanned document and having text comprising a plurality of words, each word comprising one or more characters, each character having a character appearance defined by one or more font properties and each word having a word appearance defined by the font properties of its characters, the OCR document having one or more pages, and each word having a fixed position relative to one of the one or more pages;

partitioning the text into a plurality of groups of words based on the fixed positions of the words relative to their respective pages, the font properties of the words, or both;

assigning an element from a predefined set of markup language elements to each of two or more groups in the plurality of groups of words, the assigning being based on the fixed positions of the words relative to their respective pages, the font properties of the words, or both;

after the element is assigned to each of two or more groups of words, deriving an element style for the assigned element, the element style comprising a character style, a layout style or both, the character style being derived from the font properties of the characters of the words in the two or more groups of words to which the element is assigned, and the layout style being derived from the text properties of the two or more groups of words to which the element is assigned; and creating an electronic document comprising a style sheet defining the element style.

2. The method of claim 1, wherein the text is partitioned into groups of words according to the fixed positions of the words relative to their respective pages and the element is assigned solely on the basis of the fixed positions of the words relative to their respective pages.

3. The method of claim 1, wherein the text is partitioned into groups of words according to the font properties of the words in the text and the element is assigned solely on the basis of the font properties of the words in the two or more groups of words.

4. The method of claim 1, wherein the text is partitioned into groups of words according to the fixed positions of the words relative to their respective pages and the font properties of the words in the text and the element is assigned based on the fixed positions of the words relative to their respective pages and the font properties of the words in the two or more groups of words.

5. The method of claim 1, wherein each group of words has a group appearance defined by one or more text properties, the method further comprising:

comparing the group appearances of all groups of words to which the assigned element is assigned, creating one or more alternate elements if the differences among the group appearances exceed a predefined threshold, and assigning each group of words to the original assigned element or an alternate element.

6. The method of claim 1, wherein the character style comprises at least one font property and an associated value.

7. The method of claim 1, wherein the layout style comprises at least one text property and an associated value.

8. The method of claim 1, further comprising detecting and setting page margins for pages of the document.

9. The method of claim 1, further comprising creating an electronic document comprising a markup language version of the OCR document.

10. A computer program product, including a machine-readable storage device, the product comprising instructions operable to cause a programmable system to:

receive an optical character recognition (OCR) document, the OCR document being an electronic document generated by an OCR description of a scanned document and having text comprising a plurality of words, each word comprising one or more characters, each character having a character appearance defined by one or more font properties and each word having a word appearance defined by the font properties of its characters, the OCR document having one or more pages, and each word having a fixed position relative to one of the one or more pages;

partition the text into a plurality of groups of words based on the fixed positions of the words relative to their respective pages, the font properties of the words, or both;

assign an element from a predefined set of markup language elements to each of two or more groups in the plurality of groups of words, the assigning being based on the fixed positions of the words relative to their respective pages, the font properties of the words, or both;

derive an element style for the assigned element after the element is assigned to each of two or more groups of words, the element style comprising a character style, a layout style or both, the character style being derived from the font properties of the characters of the words in the two or more groups of words to which the element is assigned, and the layout style being derived from the text properties of the two or more groups of words to which the element is assigned; and create an electronic document comprising a style sheet defining the element style.

11. The product of claim 10, wherein the text is partitioned into groups of words according to the fixed positions of the words relative to their respective pages and the element is assigned solely on the basis of the fixed positions of the words relative to their respective pages.

12. The product of claim 10, wherein the text is partitioned into groups of words according to the font properties of the words in the text and the element is assigned solely on the basis of the font properties of the words in the two or more groups of words.

13. The product of claim 10, wherein the text is partitioned into groups of words according to the fixed positions of the words relative to their respective pages and the font properties of the words in the text and the element is assigned based on the fixed positions of the words relative to their respective pages and the font properties of the words in the two or more groups of words.

14. The product of claim 10, wherein each group of words has a group appearance defined by one or more text properties, the product further comprising instructions operable to cause a programmable system to:

compare the group appearances of all groups of words to which the assigned element is assigned;

create one or more alternate elements if the differences among the group appearances exceed a predefined threshold; and assign each group of words to the original assigned element or an alternate element.

15. The product of claim 10, further comprising instructions operable to cause a programmable system to:

detect and set page margins for pages of the document.

16. The product of claim 10, further comprising instructions operable to cause a programmable system to:

create an electronic document including a markup language version of the OCR document.

17. A system comprising at least one programmable processor and a machine-readable storage device storing instructions for execution by the at least one processor, the instructions comprising instructions to:

receive an optical character recognition (OCR) document, the OCR document being an electronic document generated by an OCR description of a scanned document and having text comprising a plurality of words, each word comprising one or more characters, each character having a character appearance defined by one or more font properties and each word having a word appearance defined by the font properties of its characters, the OCR document having one or more pages, and each word having a fixed position relative to one of the one or more pages;

partition the OCR text into a plurality of groups of words based on the fixed positions of the words relative to their respective pages, the font properties of the words, or both;

assign an element from a predefined set of markup language elements to each of two or more groups in the plurality of groups of words, the assigning being based on the fixed positions of the words relative to their respective pages, the font properties of the words, or both;

derive an element style for the assigned element after the element is assigned to each of two or more groups of words, the element style comprising a character style, a layout style or both, the character style being derived from the font properties of the characters of the words in the two or more groups of words to which the element is assigned, and the layout style being derived from the text properties of the two or more groups of words to which the element is assigned; and create an electronic document comprising a style sheet defining the element style.

18. The system of claim 17, wherein the text is partitioned into groups of words according to the fixed positions of the words relative to their respective pages and the element is assigned solely on the basis of the fixed positions of the words relative to their respective pages.

19. The system of claim 17, wherein the text is partitioned into groups of words according to the font properties of the words in the text and the element is assigned solely on the basis of the font properties of the words in the two or more groups of words.

20. The system of claim 17, wherein the text is partitioned into groups of words according to the fixed positions of the words relative to their respective pages and the font properties of the words in the text and the element is assigned based on the fixed positions of the words relative to their respective pages and the font properties of the words in the two or more groups of words.

21. The system of claim 17, wherein each group of words has a group appearance defined by one or more text properties, the system further comprising instructions operable to cause a programmable system to:

compare the group appearances of all groups of words to which the assigned element is assigned;

create one or more alternate elements if the differences among the group appearances exceed a predefined threshold; and assign each group of words to the original assigned element or an alternate element.

22. The system of claim 17, wherein:
the character style includes at least one font property and an associated value.

23. The system of claim 17, wherein:
the layout style includes at least one text property and an associated value.

24. The system of claim 17, wherein the instructions for execution by the at least one processor further comprise instructions to:

detect and set page margins for pages of the document.

25. The system of claim 17, wherein the instructions for execution by the at least one processor further comprise instructions to:

create an electronic document including a markup language version of the OCR document.

\* \* \* \* \*